United States Patent [19]
Johnson

[11] Patent Number: 5,215,794
[45] Date of Patent: Jun. 1, 1993

[54] COFFEE CARAFE

[76] Inventor: Kendrick A. Johnson, 8242 Queen Ave. South, Bloomington, Minn. 55431

[21] Appl. No.: 767,031

[22] Filed: Sep. 27, 1991

Related U.S. Application Data

[63] Continuation-in-part of Ser. No. 432,522, Nov. 6, 1989, Pat. No. 5,108,808, which is a continuation-in-part of Ser. No. 157,746, Feb. 18, 1988, Pat. No. 4,879,146.

[51] Int. Cl.$^5$ .................. A47J 27/00; A47G 19/14
[52] U.S. Cl. ........................ 428/35.8; 215/1 C; 222/475.1; 428/35.7; 428/141; 428/142; 428/195; 428/206; 428/208; 428/209; 428/216; 428/220; 428/408; 428/457; 428/458; 428/328
[58] Field of Search ............... 428/35.7, 35.8, 216, 428/220, 458, 457, 141, 142, 195, 206, 208, 209, 408, 328; 215/1 C; 222/475.1

[56] References Cited

U.S. PATENT DOCUMENTS

| | | | |
|---|---|---|---|
| 2,964,794 | 12/1960 | Peilstocker et al. | 18/55 |
| 3,114,484 | 12/1963 | Serio | 222/465 |
| 3,800,988 | 3/1974 | Karlen et al. | 222/465 |
| 3,847,867 | 11/1974 | Heath et al. | 260/47 |
| 3,847,869 | 11/1974 | Williams, III | 260/47 |
| 3,850,885 | 11/1974 | Takekoshi et al. | 260/47 |
| 3,852,242 | 9/1975 | White | 528/170 |
| 3,855,178 | 12/1975 | White et al. | 260/45.7 |
| 4,008,203 | 2/1977 | Jones | 260/49 |
| 4,432,340 | 2/1984 | Conant et al. | 126/390 |
| 4,503,168 | 3/1985 | Hartsing, Jr. | 523/100 |
| 4,526,920 | 7/1985 | Sakashita et al. | 524/548 |
| 4,539,370 | 9/1985 | Nouvertne et al. | 525/67 |
| 4,655,564 | 4/1987 | Czech | 351/41 |
| 4,673,708 | 6/1987 | Rock et al. | 525/66 |
| 4,695,602 | 9/1987 | Crosby et al. | 524/440 |

OTHER PUBLICATIONS

Miller Thermal, Inc., Chart *"Thermal Spray Processes"*.
Miller Thermal, Inc., Chart *"Spray Coating Selector"*.

*Primary Examiner*—Ellis P. Robinson
*Assistant Examiner*—A. Turner
*Attorney, Agent, or Firm*—Kinney & Lange

[57] ABSTRACT

The present invention is a coffee carafe, having a thin base and thin sidewalls formed of a polymer such as polyetherimide, polyethersulphone, or other high temperature polymer having a heated thermally conductive coating applied to a coat receiving portion of the carafe and having characteristics permitting heating of the resinous carafe on a hot plate.

18 Claims, 3 Drawing Sheets

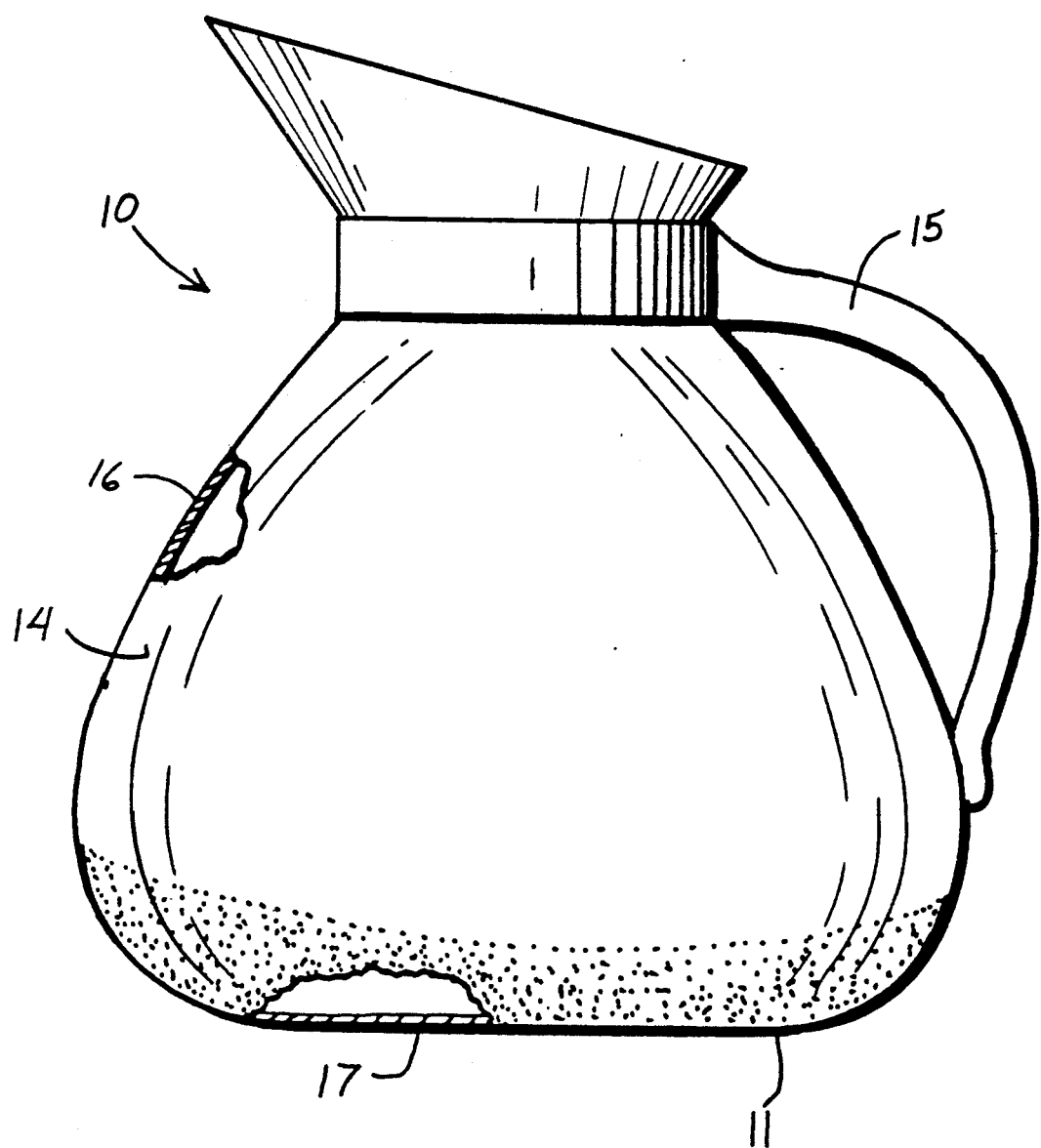

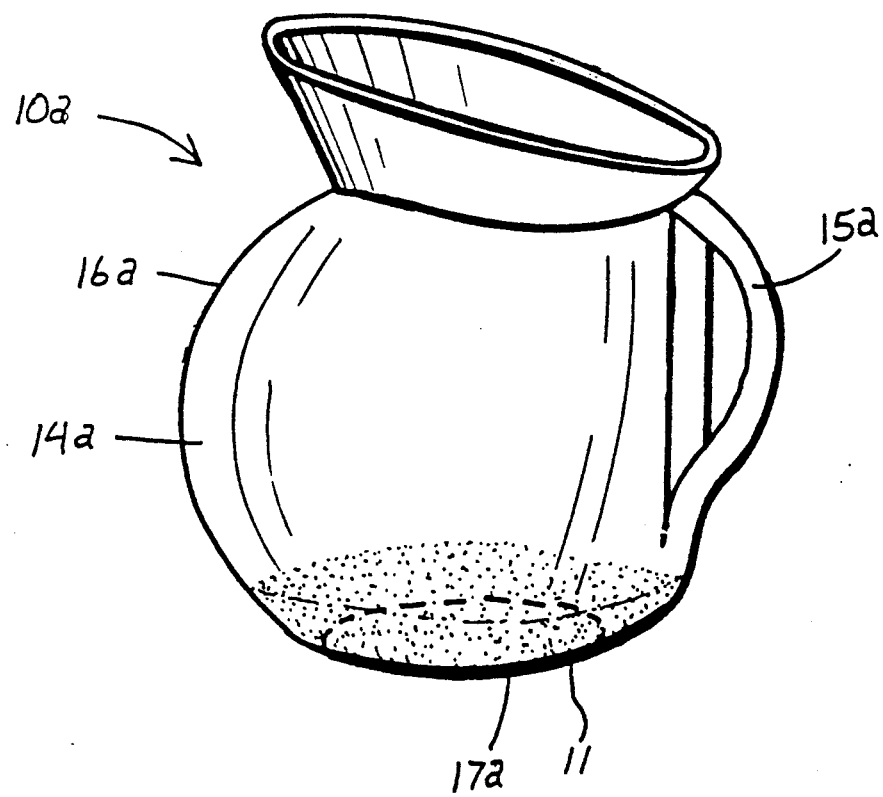

COFFEE CARAFE

BACKGROUND OF THE INVENTION

This is a continuation-in-part of U.S. patent application Ser. No. 07/432,522, filed Nov. 6, 1989, now U.S. Pat. No. 5,108,808 which is a continuation-in-part of U.S. patent application Ser. No. 157,746, filed Feb. 18, 1988 now U.S. Pat. No. 4,879,146.

FIELD OF THE INVENTION

The present invention relates to containers and, particularly, food containers suitable for heating on a hot plate.

Food containers suitable for heating have been available for many years and this technology is today a highly developed art. One type of food container has been the coffee carafe typically used with coffee brewers. The coffee brewer will generally have a compartment for heating of water to a brewing temperature. The water is then expelled into a portion of the device containing ground coffee beans. The hot water brews into highly palatable coffee. Such coffee brewers have generally included a coffee carafe with a glass bowl and a polymeric handle bonded to the carafe. The handle may be secured to the bowl by use of a retractable metal band. Alternatively, the polymeric handle may include a polymeric ring that is fused to the upper portion of the glass bowl. Coffee brewers and glass coffee carafes can today be found in most homes, offices and building facilities.

While the glass coffee carafe has been a useful item, it has possessed several disadvantages. The glass coffee carafe, of course, has been highly susceptible to breakage. For example, if a glass coffee carafe is dropped onto a counter or a floor surface, it shatters producing dangerous glass fragments, creating substantial liability for businesses as well as suppliers of the coffee carafe. Such glass coffee carafes have also been susceptible to lime deposits. The lime over time discolors the glass leaving a substantial and unpleasing deposit. The deposit may adversely affect the flavor of the brewed coffee resulting in a stale coffee flavor.

Various attempts have beer made to overcome these disadvantages of the glass coffee carafe. Such attempts in the past have been unsuccessful. One such attempt has involved a carafe having a bowl made of polysulfone. The polysulfone carafe was unsatisfactory and was changed to a composite structure which is now commercially marketed as a carafe including a lower portion constructed of metal and an upper portion constructed of polysulfone. This unit likewise includes a handle which may be secured in place by fusion of the polymers. While this construction overcomes, at least to a certain degree, the breakage problem encountered in glass carafes, it has its own inherent disadvantages. For example, a seam exists between the metal portion and the polysulfone portion. Such seam permits accumulation of foreign matter and thus creates potential for accumulation of bacteria and other unhealthful material. Further, the polysulfone tends to degrade with repeated heating and washing with detergent, becoming crazed, discolored and unappetizing.

While a variety of food containers have been provided in the past made of polymeric materials, for example, polyethylene, such containers have not been suitable for direct heating, particularly on a hot plate, since prior polymeric materials have tended to become fused when heating to temperatures, for example, in excess of 300° F. Illustrative is the polysulfone material.

Applicant has discovered that the disadvantages of the glass carafe, the composite coffee carafe of metal and polysulfone portions, and the existing polymeric food containers can be overcome. The present invention provides a container, e.g. polymeric coffee carafe, which is transparent, translucent or opaque, and which may be heated to average temperatures well in excess of 300° F., e.g. 375° F. and higher, the carafe has a heat dispersing coating on its lower portion and the carafe is not fragile. Moreover, the present coffee carafe is not susceptible to absorption either inside or outside the carafe. If the coffee is boiled dried in the present carafe, not only will a mere swishing of water remove the coffee residue, but the carafe will not be harmed.

SUMMARY OF THE PRESENT INVENTION

The present inventive method includes forming blow molding a polymeric container from a polymer, which may be polyetherimide resin, polyethersulphone resin or any other suitable polymeric material. The carafe can be molded into any desired shaped or size. In the method of making the present invention, a hollow cylindrical parison is first extruded of the resin with the parison weighing between about 80 and 125 grams. A blow tube is then inserted into the molten parison and a gaseous medium e.g. air at a pressure of about 100 p.s.i.g., is blown into the parison while the parison is disposed within a mold having the shape and size of the outside of the desired product. The parison is thus blown up much like a balloon until it is forced into shaping engagement with the mold. The blow molded product is then cooled to solidify the polymer for removal from the mold. The blow molded product then has the top surface cut away to provide the upper lip of the coffee carafe. Alternatively, the opening may be molded into the carafe. The typical cycle is about 8 to 10 seconds. Alternatively, the product may be made by injection blow molding.

The lower surface of the present carafe is coated such as with metal to improve distribution of heat from a hot plate. The metal coating may be applied by spray coating a composition on the surface to accept copper coating from an electrolysis copper bath. Chrome may then be electroplated over the copper coating.

Spray coating may include the following steps. A coat receiving portion of the carafe is preferably sandblasted prior to application of the coating. The bottom can also be molded with a textured surface to create more ridges and surface area to absorb heat. Next, a heated thermally conductive coating is applied to the lower external portion of the carafe. The heated coating composition may be sprayed on the carafe. Acceptable methods of spraying include flame spraying and arc spraying. A sealing material may be applied to the coated lower external portion of the carafe to prevent the coating from absorbing liquids. Acceptable sealing materials are silicon, sodium silicate or any other appropriate sealant known in the art.

The inventive product of the present invention preferably includes a carafe that is designed in the manner taught by the application having Ser. No. 07/432,522. However, due to the coating, the polymer utilized does not need to be stable to as high a temperature as described in application Ser. No. 07/432,522. The carafe of application Ser. No. 07/432,522 is constructed of a heat stable polymer that permits heating on a plate having a temperature of at least 190° F., typically a temperature of between 250° and 400° F.

The container is of blow molded construction, having a thin wall bowl and a handle. The walls, for example, may have a thickness of at least about 0.01 inches and no more than 0.03 inches, preferably about 0.015 to 0.025 inches. The walls are of resin and are semi-rigid and non-fragile. The carafe is heat stable to permit heating on a plate having a temperature of at least 190° F., typically a temperature of between 250° and 400° F. The walls of the carafe are semi-rigid and non-fragile.

Preferably a handle is secured to the carafe. In one preferred embodiment a handle is molded into the unit during the blow molding process. In another embodiment, a hub is molded into the carafe. The handle is the disposed about and secured preferably with a nonmetallic rivet to the hub. Alternatively, the handle could be attached to the bowl of the coffee carafe with a retractable metal band.

The polymeric carafe has a thermally conducting coating applied to the external portion of the base. This coating may extend upward on the lower portions of the side wall. The coating may be aluminum or silicon bronze. Preferably, the coating is sealed to prevent absorption of liquids with a film such as silicon, sodium silicate or chrome.

BRIEF DESCRIPTION OF THE DRAWINGS

FIG. 2 illustrates a first embodiment of the present coffee carafe; and

FIG. 3 illustrates another embodiment of the present coffee carafe.

DETAILED DESCRIPTION OF THE PREFERRED EMBODIMENTS

Figure 1:
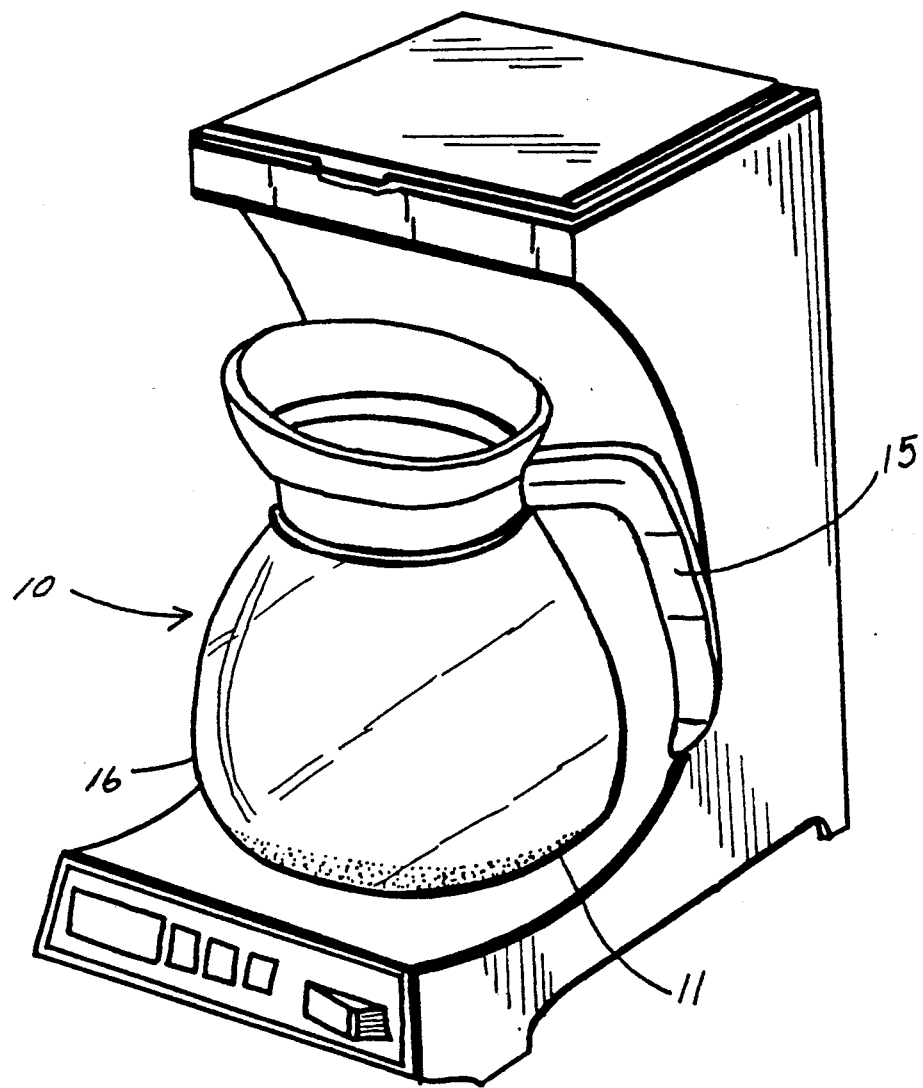
FIG. 1 schematically illustrates a conventional coffee brewer including a coffee carafe of the present invention.

FIG. 1 illustrates the coffee carafe of the present invention in its normal use environment, positioned on the heating plate of a coffee brewer. The coffee carafe 10 (FIG. 2) of the present invention includes a bowl 14 and a handle 15. The bowl portion 14 may be formed of a polymer of resin (e.g. polyetherimide, polyethersulphone, polysulfone, composites of high temperature resins). The bowl is of a thin wall construction having a side wall thickness of at least about 0.009 inches and desirably less than 0.03 inches in thickness. The preferred thickness is 0.020 inches. The base may have a minimum thickness of at least 0.050 inches up to 0.10 inches. The present carafe may itself be heated to temperatures of at least 375° F.

It has been found that the thickness is critical for several reasons. First, the base 17 in contact with a hot plate of the brewer must be thin to permit heat transfer through the resin. If the base is thickened, heat is accumulated in the lower side of the bottom wall. The present resins tend to be an insulating material that does not readily transfer heat. Thus, the unit is very inefficient if the bottom wall is too thick e.g. more than 0.100 inches. If the side wall 16 is thickened, for example, more than 0.100 inches in thickness, the side wall 16 tends to crack and break.

The following table sets forth characteristics of the resin used in the present carafe:

TABLE

| Property | Test Method | Units | Values |
| --- | --- | --- | --- |
| GENERAL | | | |
| Relative density | ASTM D792 | — | 1.37 |
| Retractive Index | — | — | 1.65 |
| Shrinkage of moulding | — | % | 0.6 |
| Glass content | — | % | 0 |
| MECHANICAL PROPERTIES | | | |
| Tensile strength at 68° F. | | | 12,200 |
| Tensile strength at 300° F. | ASTM D638 | psi | 8,000 |
| Tensile strength at 355° F. | | | 5,950 |
| Elongation at break | ASTM D6338 | % | 40-80 |
| Flexural strength | ASTM D790 | psi | 18,700 |
| Flexural modulus at 68° F. | | | 855,600 |
| Flexural modulus at 300° F. | ASTM D790 | psi | 841,100 |
| Flexural modulus at 355° F. | | | 812,100 |
| Izod impact strength 6.4 mm (0.250 in) specimen notched | ASTM D256 | ft-lb/in | 1.42-2.25 |
| 6.4 mm (0.250 in) specimen unnotched | ASTM D256 | ft-lb/in | no break |
| Rockwell hardness | ASTM D785 | — | M88 |
| Taber abrasion 1 Kg load CS17 wheel | ASTM D1044 | 6 | 8 |
| THERMAL PROPERTIES | | | |
| Heat distortion temp. at 264 lbf/in2 | ASTM D648 | °F. | 397 |
| Vicat softening point | | | |
| 1 Kg (2.2 lbs) | ASTM D1525 | °F. | 439 |
| 6 Kg (11.0 lbs) | | °F. | 432 |
| Coefficient of linear thermal expansion | ASTM D696 | per deg C. | 5.5 × 10 |
| Underwriters Labs. temp. index | UL746 | °F. | 356 |

The polyetherimide used in the present invention may be produced as disclosed in U.S. Pat. Nos. 3,847,867; 3,847,869; 3,850,885; 3,852,242 or 3,855,178. These disclosures are incorporated herein by reference for purposes of teaching the production of the polyetherimide. The present polyetherimide desirably is an unreinforced polyetherimide having a molecular weight of about 19,000 and has a glass transition temperature in excess of 400° F.

The polyethersulphone of the present invention may be prepared as disclosed in U.S. Pat. No. 4,008,203. Such disclosure is incorporated herein by reference for the purpose of teaching the production of the present polyethersulphone. The polyethersulphone may have a tensile strength at 68° F. of 12,200 psi; at 300° F. of 8,000 psi; and at 355° F. of 5,950 psi measured according to ASTM D638. The present polyethersulphone may have a flexural strength of 18,700 psi as measured by ASTM D790. The polyethersulphone may have a heat distortion temperature at 1.82 of 264 lbs/in² of 397° F. as measured by ASTM D648. The present polyethersulphone may have a Vicat softening point at 2.2 lbs. of about 439° F. as measured by ASTM D1525. The polyethersulphone may be Victrex 4100 series produced by Imperial Chemical Industries Limited of London, England. Victrex 4100 can be clear, or tinted: blue, black, brown or almost any other color. Alternatively, the Victrex 4100 can be opaque.

The polymeric carafe was tested under stress to determine if crazing would occur. At a temperature of 180° F. and a stress of 3200 p.s.i. no crazing occurred following 14 days. No crazing occurred at a temperature of 194° F. and a stress of 2400 p.s.i. even after 14 days. The carafe was found to have a Rockwell hardness of M109.

The present invention also includes a coating 11 on the lower external portion of the carafe. A coating is a material that is heated prior to application such that it heat seals to the carafe. The coating may have a minimum thickness of 0.0010 inch, a maximum thickness of 0.0020 inch, and a preferred thickness of 0.0015 inch.

A coating on a polymeric carafe has special advantages. Since the coating becomes a layer of the carafe, dirt and grim cannot get caught in joints as easily. Implementation of the thermal conducting coating also allows the bottom wall to be made thinner. It allows the carafe to withstand spot temperatures much higher, e.g. 100° F. higher than the polymer could withstand without a coating.

The higher the thermal conductivity of the coating, the more uniformly the heat from the heat mechanism is dispersed. Regardless, this coating disperses heat from the hot plate helping make the temperatures from the heating mechanism more uniform. Thus, the carafe can withstand spot temperatures over 400° F. even if the polymer cannot withstand an average temperature above 400° F. This allows a polymeric coffee carafe to be utilized with heating mechanisms that have non-uniform surface temperatures.

The coating material may have the following characteristics. The coating material should tightly and firmly adhere to the polymeric carafe. The coating material should remain adhered to the carafe when the carafe is in use. Additionally, the coating material should be highly thermally conductive. Two suitable materials that may be sprayed on to the coat receiving portion of a carafe are aluminum and silicon bronze.

The coat receiving portion of the carafe may include the external surfaces of the bottom and the lower sidewalls of the carafe. Based on the method of spraying used, the coat receiving portion of the carafe will vary in size. While with one method the coat receiving portion may encompass just the base of the carafe. Under another method of spraying, the coat receiving portion may encompass the base and extend a substantial distance up the side wall of the carafe. Whichever spraying method is used the coating should cover the portion of the carafe that is in direct contact with the hot plate.

The coating is preferably covered with a liquid resistant film. The film ma also prevent oxidization. Without the film, water and coffee could stain and thereby reduce the aesthetic appearance of the pot. The film prevents absorption of water and coffee. Some acceptable film materials are silicon, sodium silicate, and chrome.

In the method of making the present carafe, a parison is extruded in the shape of a hollow cylinder of a length suitable for blow molding the present coffee carafe. It has been found that approximately 90 to 130 grams of polymer is appropriate for a coffee carafe of the conventional size. The parison is blown to form a bubble shape of the mold interior surface. The mold is then opened and the coffee carafe is opened at the upper end to provide a lip and pouring spout by cutting away the upper portion. Alternatively, the pouring spout can be formed in the molding process.

A handle may be attached to the bowl. This may be of any of the conventional types used with respect to glass coffee carafes. For example, the conventional unit including a metal band attached to a plastic or resinous handle. The metal band may be tightened by a screw mechanism to securely grip the upper portion of the bowl. The mechanism includes a screw extending though the band into a plug both of which fit into a socket molded into the handle. In another embodiment, a hub is molded into the carafe. The handle is the disposed about and secured preferably with a non-metallic rivet to the hub. Alternatively, the handle may be molded as a part of the carafe.

An alternative embodiment 10a of the present invention is illustrated in FIG. 3. In this instance, the entire carafe is formed during the blow molding process, including the side wall 16a, base 17a and handle 15a. The bowl may be of the same material as described with regard to the embodiment illustrated in FIGS. 1 and 2, however, in this instance, the handle is formed by molding a portion of the parison into the desired handle shape a the mold is closed around the parison. The bowl portion is then formed by blow molding the parison. The wall thicknesses may be as described with regard to the embodiment illustrated in FIG. 2. The handle portion may be ½ inch to ⅞ inch in width and having a thickness of perhaps 1/16 to ⅛ of an inch.

As illustrated in FIG. 3, a thickened rib is provided along each edge of the handle. The thickened rib may be about ⅛ to 3/16 of an inch in thickness. This provides for strengthening stability of the handle during use.

The method of the present invention also includes applying a thermally resistant coating to the carafe 10 or 10a. Preferably the coat receiving portion of the polymeric carafe is sandblasted with aluminum oxide or other appropriate abrasive material. Alternatively, the carafe may be molded with a roughened bottom surface. A roughened bottom surface is desirable for application of a coating composition.

The heated coating composition is sprayed on to the coat receiving portion of the carafe. The coating may be sprayed through either a flame sprayer or an arc sprayer, such as the MILLER PB 400. The sprayer should be set at 50-100 amperes. The coating should be sprayed from 4 to 6 inches away from the carafe. And the rate of spray should be approximately 100 surface feet per minute.

The applied coating is then covered with a film to prevent absorption of water or coffee oils or oxidization of the coating. Some suitable film materials are silicon, sodium silicate and chrome. Such absorption, if allowed to occur, would stain the coating and ruin the aesthetic appearance of the carafe.

Although the present invention has been described with reference to preferred embodiments, workers skilled in the art will recognize that changes may be made in form and detail without departing from the spirit and scope of the invention.

What is claimed is:

1. A polymeric carafe comprising:
   a bowl having a sidewall and a base constructed of a thermally resistant polymer, said sidewall having a minimum thickness of about 0.009 inch and a maximum thickness of about 0.100 inch, said base having a minimum thickness of about 0.05 inch and a maximum thickness of about 0.100 inch, said sidewall and said base defining an external surface of said bowl;
   a roughened portion of said external surface of said bowl comprising said external surface of said base and defining a coat receiving portion of said carafe;
   a thermally conductive coating heat sealed to said coat receiving portion of said bowl, said coating having a minimum thickness of 0.001 inch and a maximum thickness of about 0.002 inch; and said carafe being heat stable on a heating plate to a plate temperature of at least 375° F.

2. The carafe of claim 1, wherein said coating is a material selected from the group consisting of aluminum and bronze.

3. The carafe of claim 1, wherein said coating is covered with a sealant to prevent absorption of liquids.

4. The carafe of claim 3, wherein said coating has been sealed with a material selected from the group consisting of silicon, sodium silicate, and chrome.

5. The carafe of claim 1 wherein the coat receiving portion consists of the external surface of the base of the carafe.

6. The carafe of claim 1 wherein said sidewall thickness is within a range of about 0.009 inch to about 0.03 inch.

7. The carafe of claim 1, wherein a handle receiving hub is formed integrally with said carafe.

8. A polymeric carafe comprising:
a bowl having a sidewall and a base constructed of a thermally resistant polymer, said sidewall having a minimum thickness of about 0.009 inch and a maximum thickness of about 0.100 inch, said base having a minimum thickness of about 0.05 inch and a maximum thickness of about 0.100 inch;
an external surface of said bowl comprising a roughened portion of said exterior surface, said roughened portion defining a coat receiving portion of said carafe, wherein said coat receiving portion comprises an external surface of said base;
a thermally conductive coating comprising a plurality of metal particles heat sealed to said coat receiving portion of said bowl, said coating having a minimum thickness sufficient to disperse heat from a heating plate such that heat transfers through said carafe at a generally uniform temperature; and
said carafe being heat stable on a heating plate to a plate temperature of at least 375° F.

9. The carafe of claim 8, wherein said coating is a material selected from the group consisting of aluminum and bronze.

10. The carafe of claim 8, wherein said coating is covered with a sealant to prevent absorption of liquids.

11. The carafe of claim 8, wherein said coating thickness is within a range of about 0.001 inch to about 0.002 inch.

12. The carafe of claim 8, wherein a handle receiving hub is formed integrally with said carafe.

13. A polymeric carafe comprising:
a bowl having a sidewall and a base constructed of a thermally resistant polymer, said sidewall having a minimum thickness of about 0.009 inch and a maximum thickness of about 0.100 inch, said base having a minimum thickness of about 0.05 inch and a maximum thickness of about 0.100 inch
an external surface of said bowl comprising a roughened portion of said external surface, said roughened portion defining a coat receiving portion of said carafe, wherein said coat receiving portion comprises an external surface of said base;
a thermally conductive coating comprising metal particles having a minimum thickness of about 0.001 inch and a maximum thickness of about 0.002 inch, and said coating being heat sealed to said coat receiving portion of said bowl; and
said carafe being heat stable on a heating plate to a plate temperature of at least 375° F.

14. The carafe of claim 13, wherein said coating is a material selected from the group consisting of aluminum and bronze.

15. The carafe of claim 13, wherein said coating is covered with a sealant to prevent absorption of liquids.

16. The carafe of claim 13, wherein a handle receiving hub is formed integrally with said carafe.

17. The carafe of claim 13, wherein said thermally conductive coating is of a generally uniform thickness.

18. A polymeric carafe comprising:
a bowl having a side wall and a abase constructed of a thermally resistant polymer, said side wall having a minimum thickness of about 0.009 inch and a maximum of about 0.100 inch, said base having a minimum thickness of about 0.05 inch and a maximum thickness of about 0.100 inch, said side wall and said base defining, an external surface of said bowl;
a roughened portion of said external surface defining a coat receiving portion of said carafe, said coat receiving portion comprising said external surface of said base;
a thermally conductive coating having a minimum thickness of about 0.001 inch and a maximum thickness of about 0.002 inch and said coating comprising a plurality of metal particles, heat sealed to said coat receiving portion of said bowl;
a sealant covering said thermally conductive coating; and
said carafe being heat stable on a heating plate to a plate temperature of at least 375° F.

* * * * *

UNITED STATES PATENT AND TRADEMARK OFFICE
CERTIFICATE OF CORRECTION

PATENT NO. : 5,215,794
DATED : June 1, 1993
INVENTOR(S) : KENDRICK A. JOHNSON

It is certified that error appears in the above-identified patent and that said Letters Patent is hereby corrected as shown below:

Col. 8, line 29, delete "abase", insert --base--

Signed and Sealed this

Eleventh Day of January, 1994

Attest:

BRUCE LEHMAN

Attesting Officer

Commissioner of Patents and Trademarks